United States Patent [19]
Eisele et al.

[11] 3,866,980
[45] Feb. 18, 1975

[54] BRAKE ANTI-LOCK TEST SYSTEM

[75] Inventors: Hermann Eisele, Ditzingen; Harald Kizler, Schwieberdingen; Ardelio Gualco, Schwieberdingen; Friedrich Rabus, Schwieberdingen; Peter Jurgen Schmidt, Schwieberdingen, Germany; Johannes Locher; Wolfgang Misch, both of Stuttgart, all of Germany

[73] Assignee: Robert Bosch GmbH, Stuttgart, Germany

[22] Filed: June 28, 1973

[21] Appl. No.: 374,306

[30] Foreign Application Priority Data
June 29, 1972 Germany.......................... 2231864

[52] U.S. Cl........... 303/21 AF, 324/73 R, 340/52 B
[51] Int. Cl.............................................. B60t 8/12
[58] Field of Search ........ 303/21 AF; 324/51, 73 R; 340/52 R, 52 B, 410

[56] References Cited
UNITED STATES PATENTS

| | | | |
|---|---|---|---|
| 3,245,213 | 4/1966 | Thompson et al....... | 303/21 AF UX |
| 3,275,384 | 9/1966 | Hirzel..................... | 303/21 AF UX |
| 3,598,452 | 8/1971 | Clifford................... | 324/73 R UX |
| 3,602,554 | 8/1971 | Ichimura et al. ........ | 303/21 AF |
| 3,706,971 | 12/1972 | Okamoto et al. ....... | 340/52 B |
| 3,759,582 | 9/1973 | Ohta et al. .............. | 340/52 B X |
| 3,767,272 | 10/1973 | Leiber ..................... | 303/21 AF |

*Primary Examiner*—George E. A. Halvosa
*Assistant Examiner*—Stephen G. Kunin
*Attorney, Agent, or Firm*—Flynn & Frishauf

[57] ABSTRACT

To test operational reliability and proper functioning of a wheel brake antilock system having a fluid operated brake, a pressure relief valve in the pressure feed line to the brake and various switches controlling operation of the relief valve, controlled by wheel deceleration (acceleration) sensing apparatus, a pressure switch is connected to be responsive to pressure in one brake cylinder, and electrical apparatus are provided to simulate a wheel deceleration signal which is connected to control operation of the switch which operates the relief valve, a test indicator is provided and further electrical apparatus which senses change in response of the pressure switch upon energization of the system, so that malfunction, for example non-response of the system, or excessive bleeding of brake pressure fluid can be indicated.

27 Claims, 6 Drawing Figures

SYSTEM TO BE TESTED

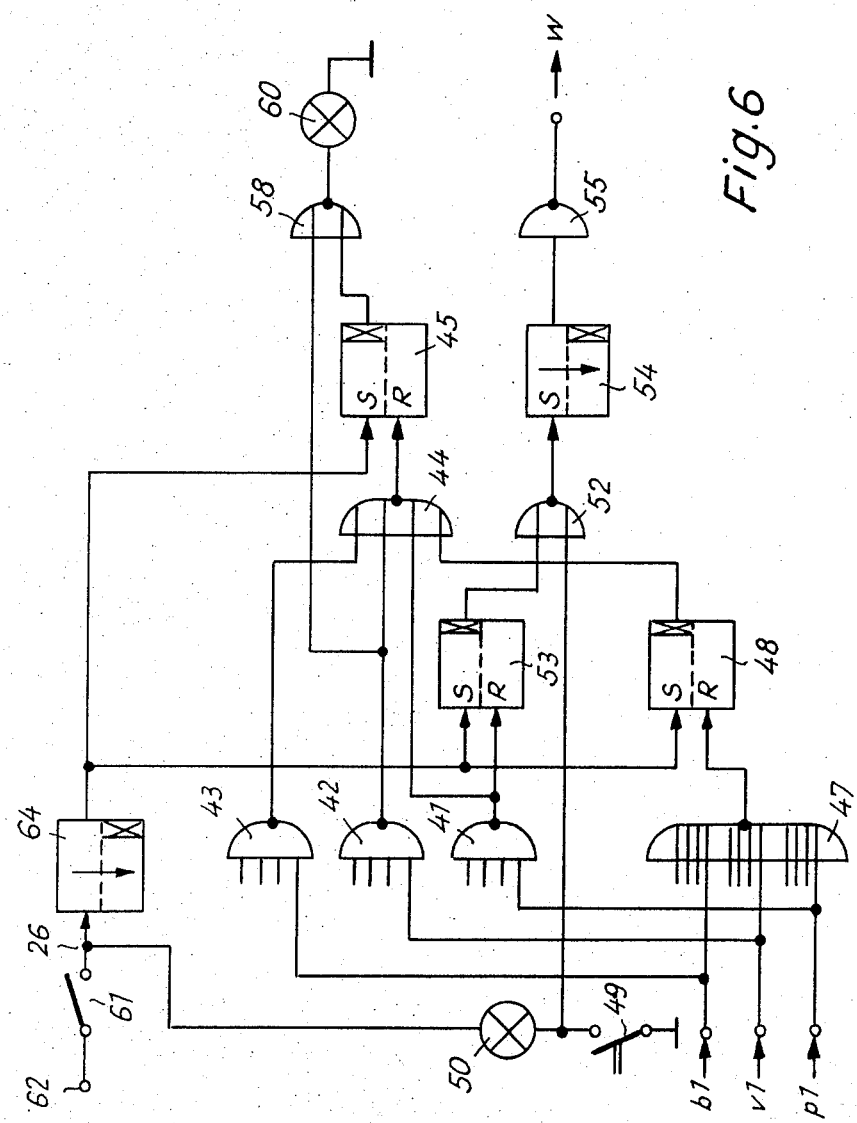

3,866,980

BRAKE ANTI-LOCK TEST SYSTEM

CROSS REFERENCE TO RELATED APPLICATIONS

U.S. Ser. No. 330,674, filed Feb. 8, 1973
U.S. Ser. No. 328,047, filed Jan. 30, 1973
U.S. Ser. No. 325,569, filed Jan. 22, 1973, now U.S. Pat. No. 3,820,857
U.S. Application Ser. No. 371,994 filed June 21, 1973.

The present invention relates to a test system to test the operating reliability of a vehicle wheel brake anti-lock control system, which acts on a pressure fluid brake connected to at least one vehicle wheel, and which includes a means to sense wheel deceleration or acceleration, and which controls a fluid pressure bleed valve by means of a switch, typically a transistor switch.

Vehicles which are supplied with anti-lock control systems can cause dangerous situations, upon braking, if the electronic circuitry should be defective, or if trouble develops in the electronic circuitry, typically, by excessive operation of the pressure bleeding valve. The situation may arise that fluid pressure will be completely dropped, so that the vehicle cannot be braked at all any more. Safety circuits and devices have been known which largely eliminate such difficulties. In one such circuit, the time during which the bleeding valve can be opened is limited by means of a time sensing circuit. After a maximum permitted opening time is sensed, the bleeding valve is closed again by the circuit, thus permitting increase of braking pressure, and hence braking effort transferred to the wheel.

If a vehicle deceleration sensor provides a delay signal after a braking cycle has been initated, the anti-lock system may operate with maximum opening time of the pressure relief valve, so that control cycles which have pressure dropping phases and pressure increasing phases will result. The operator of the vehicle, in such a case, cannot determine whether the anti-lock system is operating properly, or not.

It is an object of the present invention to provide a circuit to test the operating reliability of a vehicle wheel anti-lock system, and which gives the operator of the vehicle an indication, in advance of commencing operation of the vehicle, that the anti-lock system is operating properly, by subjecting the anti-lock system to a test program in which the various elements and basic components of the vehicle brake anti-lock systems are tested to ensure that they function properly.

SUBJECT MATTER OF THE PRESENT INVENTION

Briefly, a circuit or system is provided which generates a simulated wheel deceleration signal; this may, for example, be a monostable multivibrator, having its output connected with the control input of the switch which causes pressure dropping of the brake cylinder pressure, typically with the control input of a transistor switch; an alarm signal is provided, controlled by a first bistable multivibrator (MV), the set input of which is controlled by the vehicle main switch (for example the ignition switch) and the reset input of which is controlled by the pressure switch associated with the wheel brake cylinder.

The test program is initiated by first energizing the main vehicle switch, for example the ignition switch of an Otto-type internal combustion engine, and thereafter by operating the brake. The pressure switch then provides a signal that the brake pressure rises, as commanded by a brake operation. The monostable vibrator, after its pulse period, provides a simulated delay signal to the switch controlling bleeding of the pressure line, which, typically is a transistor switch, thus causing a drop in brake fluid pressure. The pressure switch will now sense a drop in brake pressure, and the first bistable MV is reset. A warning signal will light, upon connecting the ignition switch, until the first bistable MV resets. When the warning lamp extinguishes, the operator knows that the anti-lock system operates properly.

Brake anti-lock systems frequently include electronic acceleration sensors which are formed of a series circuit of a pulse type tachometer generator, a frequency-dc voltage converter, a differentiator, and one or more threshold switches. In such anti-lock systems (see, for example, the aforementioned cross referenced applications), the operating reliability of the differentiator and at least one of the threshold switches can be tested, in accordance with a feature of the invention, when the output of the monostable MV is connected to the input of the differentiator, and the outputs of the first threshold switch and the pressure switch are connected over a logic network, such as a logic gate to the reset input of the first bistable MV. Such a connection will have the effect that the warning lamp will only extinguish if: (a) the pressure switch is reset and (b) the first threshold switch has responded to an output signal of the differentiator.

Wheel anti-lock systems have been proposed which include not only a control loop with an acceleration sensor, but additionally a second control loop which senses wheel slip, that is, the difference between speed of the vehicle and circumferential speed of the wheel. Wheel slip beyond a certain limit is sensed by a second threshold switch. A comparator is provided, connected to the frequency - d-c converter on the one hand and to the output of the second threshold switch, in order to compare vehicle speed with wheel circumferential speed. Brake fluid pressure is decreased over the bleeder valve if the slip between circumferential wheel speed and vehicle speed exceeds a certain limit.

In accordance with an embodiment of the invention, the second threshold switch of such an anti-lock system can be tested if the second threshold switch has its output connected to the input of a logic network, typically a logic gate which is so connected that the warning lamp will extinguish only if the slip detecting circuit has responded.

The invention will be described by way of example with reference to the accompanying drawings, wherein:

FIG. 6 is a schematic diagram of another embodiment of the present invention.

Figure 1:
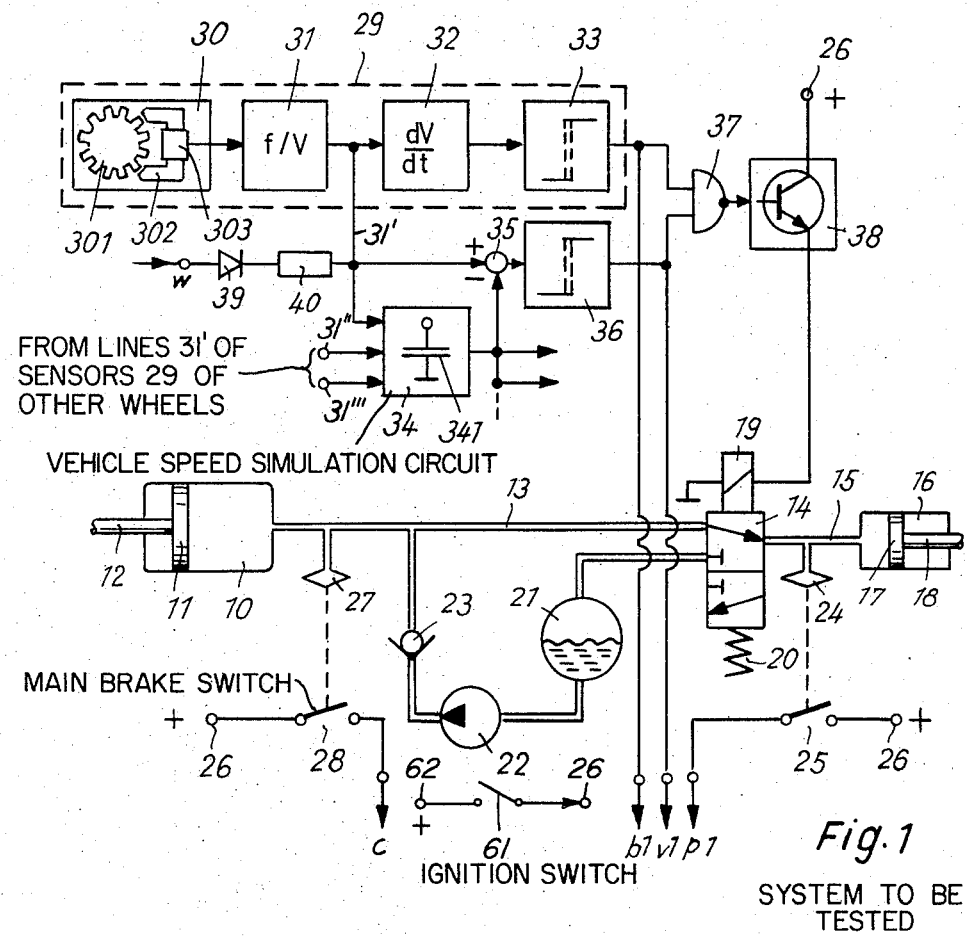
FIG. 1 is a highly schematic, and simplified diagram of a vehicle wheel brake anti-lock system.

The basic components of a vehicle wheel brake anti-lock system are illustrated in FIG. 1, where a master cylinder 10 provides brake fluid pressure by means of a piston 11. Piston 11 can be operated, for example, directly from a brake pedal over a piston rod 12, by means of a power brake system or the like. The pressure fluid is admitted into the master cylinder 10 over a main fluid line 13, a valve 14, and conducted over a wheel brake line 15 to the wheel brake cylinder 16. Wheel brake cylinder 16 has a piston 17 operable therein, which connects by means of piston rod 18 to the brake shoes, or brake pads, or the like, of a wheel brake.

Pressure valve 14 is shown as a three/two way valve, but may have different forms. It is operated by a magnet solenoid 19, and held in a normal quiescent position, as shown in FIG. 1, by means of spring 20. A third connection of the three/two valve 14 connects to a sump 21, from which a pump 22 supplies pressure fluid over a check valve 23 back to the main brake line 13.

In the quiescent or inoperative portion, valve 14, as shown in FIG. 1, provides a free path for pressure fluid from main brake line 13 to wheel brake line 15; the third connection to the sump is blocked. In operated condition of the valve, this is, when solenoid 19 is energized, the path from wheel brake line 15 to sump 21 is connected, and the main brake line 13 is cut off.

Wheel brake line 15 is connected to a pressure sensing device 24, operating a switch 25, the elements 24, 25 forming together a pressure switch. Switch 25 is connected between a positive bus 26 and a terminal p1. Switch 25 closes when the braking pressure in line 15 exceeds a certain lower pressure limit.

Main brake line 13 has a pressure sensing device 27 connected thereto which operates a switch 28. Elements 27, 28 form a pressure sensitive switch, which may, for example, be the brake light switch. It is connected between positive bus 26 and the terminal c. The terminal c is connected to the brake lights of the vehicle (not shown).

Solenoid 19 of the pressure valve 14 is controlled by a wheel anti-lock system, shown in FIG. 1 in highly schematic form. Various types of systems may be used, some being described in the cross referenced applications. In its simplest form, a wheel speed rate of change sensor 29 has a tachometer pulse generator 30, a frequency-voltage converter 31, a differentiator 32, and a first threshold switch 33. The output of the frequency-voltage converter 31 is further connected by line 31' to the + input of an adder circuit (connected as a comparator), the output of which is connected to a second threshold switch 36. The output of the frequency - d-c converter 31, i.e., line 31' is further connected to a stage 34 which is a vehicle speed simulating circuit. Stage 34 includes a storage capacitor 341. The outputs of frequency - voltage converters connected to other wheels of the vehicle, not shown, and available on similar lines 31' are connected to further inputs 31'', 31''' of unit 34. Other outputs of unit 34, and not specially referred to, are likewise connected to adders 35 of the anti-lock systems of other wheels. A terminal w is connected to a diode 39, and a resistor 40 in series therewith, and to the output of the frequency-voltage converter 31, and hence to the + input of the adder 35.

A NAND-gate 37 has two inputs connected to the outputs of the threshold switches 33, 36. The output of NAND-gate 37 is connected to the control input of a transistor switch 38. The collector terminal of transistor switch 38 is connected to positive line 26, and the emitter is connected through solenoid 19, operating valve 14, to ground or chassis.

The tachometer generator 30 includes a toothed wheel 301, driven by the vehicle wheel, the brake of which is controlled by the brake anti-lock system. The wheel 301 has magnetic teeth which are opposed by a yoke 302, on which a coil 303 is wound. Upon rotation of wheel 301, the magnetic reluctance of the magnetic circuit formed by the yoke 302 and the teeth 301 will change, and coil 303 will have alternating voltages induced therein, the frequency of which is proportional to the rotation and thus to circumferential speed of the vehicle wheel.

The output pulses of the pulse tachometer generator 30 are transferred into a d-c voltage in the frequency - d-c converter 31 which, in its most simple case, may be a low pass filter. The output voltage derived therefrom will be proportional to wheel circumferential speed. The storage capacitor 341 in the speed simulating stage 34 is charged by the various frequency - d-c voltage converters 31 to a voltage which is proportional to the circumferential speed of the wheel which has the highest rotational speed. If it is assumed — which is a usually valid assumption — that at least one of the vehicle wheels is not locked, that is, is in a rolling contact with the road surface, vehicle speed is simply and accurately transformed into an electrical signal.

Basic operation: If the wheel under consideration begins to lock, the output voltage of frequency - d-c converter 31 will drop rapidly, and differentiator 32 will provide a negative output signal indicative of wheel deceleration. The first threshold switch 33 will respond at a certain predetermined value of wheel deceleration. It may occur that the wheel deceleration is not of such a level that the first threshold switch will respond, and the vehicle wheel, nevertheless, will have a tendency to lock. The summing circuit 35 will then compare wheel circumferential speed, with vehicle speed and provide an output indicative of the difference between wheel circumferential speed and vehicle speed. When this difference exceeds a certain threshold level, second threshold switch will respond.

The electronic portion of the circuit utilizes digital technology and, accordingly, the concepts of a 1-signal and a 0-signal will be used; in the present specification, a 1-signal occurs if the output is at, or close to the voltage level of positive line 26; if the respective point or line is at, or close to ground or chassis potential, the line will be considered to have a 0-signal thereon.

Both threshold switches 33, 36 are so designed that, in quiescent condition, they provide 1-signals. In this case, only, the first NAND-gate 37 will provide a 0-signal, thus blocking transistor switch 38. If at least one of the threshold switches 33, 36 responds, and provides a 0-signal, the first NAND-gate will have a 1-signal at its output, and transistor switch 38 provides energizing power to solenoid 19 from positive bus 26, thus changing the valve 14 into its energized position. As a result, fluid will bleed from the wheel brake cylinder 16 into sump 21, causing a drop in brake pressure. The pressure drop will extend until the vehicle wheel is not excessively decelerated, that is, until its circumferential speed is roughly equal to vehicle speed. At that point, both threshold switches 33, 36 will revert into their quiescent position, and transistor switch 38 will block. The alternate cycles of pressure drop, and pressure rise will repeat periodically. The brake anti-lock system will thus control the pressure of the brake fluid to be an average pressure which corresponds to optimum braking of the vehicle wheel, without locking.

More than one threshold switch may be used, and various other systems, causing different sequences, and slower pressure rises, for example by pulse sources can be used, as referred to in the cross referenced applications.

The system of FIG. 1 has been drawn essentially in connection with a hydraulic braking system in which a sump 21 and a supply pump 22 are used. The test system of the present invention may be used as well as pneumatic braking systems, and the basic control system does not change if a pneumatic brake is provided. Pneumatic brakes are usually not operated with a closed pressure fluid circuit (sump 21 and recirculating pump 22); rather, compressed air is permitted to escape directly into ambient atmosphere by the control valve 14. The system can readily be modified for use with vacuum brakes, in which differential braking pressure on the cylinders is obtained, not by higher than atmospheric, but rather by lower than atmospheric pressure.

Figure 2:
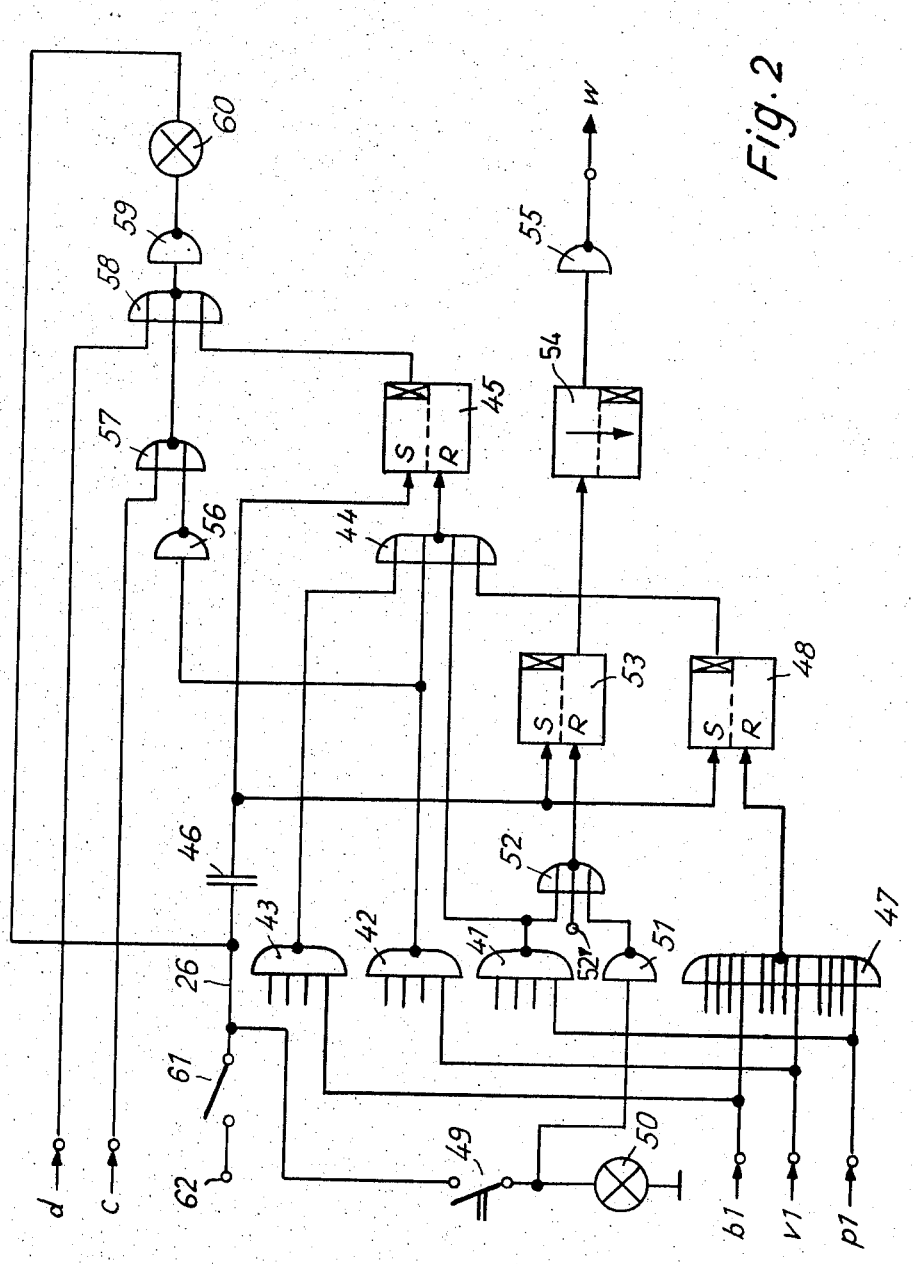
FIG. 2 is a schematic diagram of an embodiment of a test circuit in accordance with the present invention.

System of the present invention, FIG. 2: Terminals $c$, $b1$, $v1$, $p1$ and $w$ are connected to the equally numbered terminals of FIG. 1, as follows: $b1$ is the output terminal of the first threshold switch 33; $v1$ is the output terminal of the second threshold switch 36; $c$ and $p1$ are the connections from switches 25, 28, respectively.

Three NAND-gates 41, 42, 43, to be referred to as the second, third and fourth NAND-gates have one terminal, each, connected to lines $b1$, $v1$, $p1$, respectively, as shown. The other terminals to the second, third and fourth NAND-gates 41, 42, 43, and not specifically numbered, are connected to similar terminals of the anti-lock systems of three other wheels of a vehicle. If the vehicle has more than four wheels, for example, as in six axle vehicles in which each axle has its own anti-lock system, then the second to fourth NAND-gates 41, 42, 43 would have six inputs.

The outputs of the NAND-gates 41–43 are connected to the inputs of a first NOR-gate 44. The output of the NOR-gate is connected to the reset input R of a first bistable flip-flop (FF) 45. The set input S of the first bistable FF 45 is connected to a capacitor 46 which has its other terminal connected to the positive bus 26.

Terminals $b1$, $v1$ and $p1$, as well as the respective corresponding terminals from the other vehicle wheels are connected to all the inputs of a second NOR-gate 47. The output of the second NOR-gate 47 is connected to reset input of a second bistable FF 48, the output of which is connected to a further input of the first NOR-gate 44. The set input S of the second bistable FF 48 is connected to the capacitor 46.

A parking or hand brake switch 49 is connected in series with a control or indicator lamp 50. Hand brake or parking brake switch 49 is closed when the parking brake is operated. The connection point between parking brake switch 49 and lamp 50 is connected over an inverter stage 51 with one input of a third NOR-gate 52. The output of the second NAND-gate 41 is connected to a second input of the third NOR-gate 52. The output of the third NOR-gate 52 is connected to the reset input R of a third bistable FF 53. The set input S of the third bistable FF 53, like the set inputs of the other bistable FFs 45, 48 is connected to capacitor 46.

A monostable MV 54 is connected to the output of the third bistable FF 53, the output of which is connected over an inverter 55 with the terminal $w$.

Terminal $c$, that is, the brake light switch terminal, is connected to the input of a fourth NOR-gate 57, the other input of which is connected to the output of the third NAND-gate 42 over an inverter 56. The outputs of the first bistable MV 45 and the fourth NOR-gate 57 are connected to two inputs of a fifth NOR-gate 58, the output of which is connected over an inverter 59 to an indicator lamp 60, the other terminal of which is connected to the positive bus 26. A third input of the fifth NOR-gate 58 is connected to a terminal $b$. This connection is not strictly necessary, but is provided if the test system is to be used with an anti-lock system which includes a time limit safety circuit, referred to above. Such a circuit limits the duration of opening of the pressure bleeding valve 14, when in the bleeding position, to a maximum period of time. This supervisory stage (not shown) interrupts current supply to solenoid 19 if a predetermined maximum duration of the opening of the pressure valve 14 is exceeded, and provides a 1-signal which is used to interrupt energization of the solenoid 19. This 1-signal is transferred to terminal $d$, and applied to the fifth NOR-gate 58, if present The positive bus 26 is connected over a main vehicle switch 61, for example over a terminal of the ignition switch to the main supply line 62 of the vehicle, for example the positive terminal of the vehicle battery. Switch 61 may be identical with the ignition switch already present and customarily used in automotive vehicles.

Figure 3:
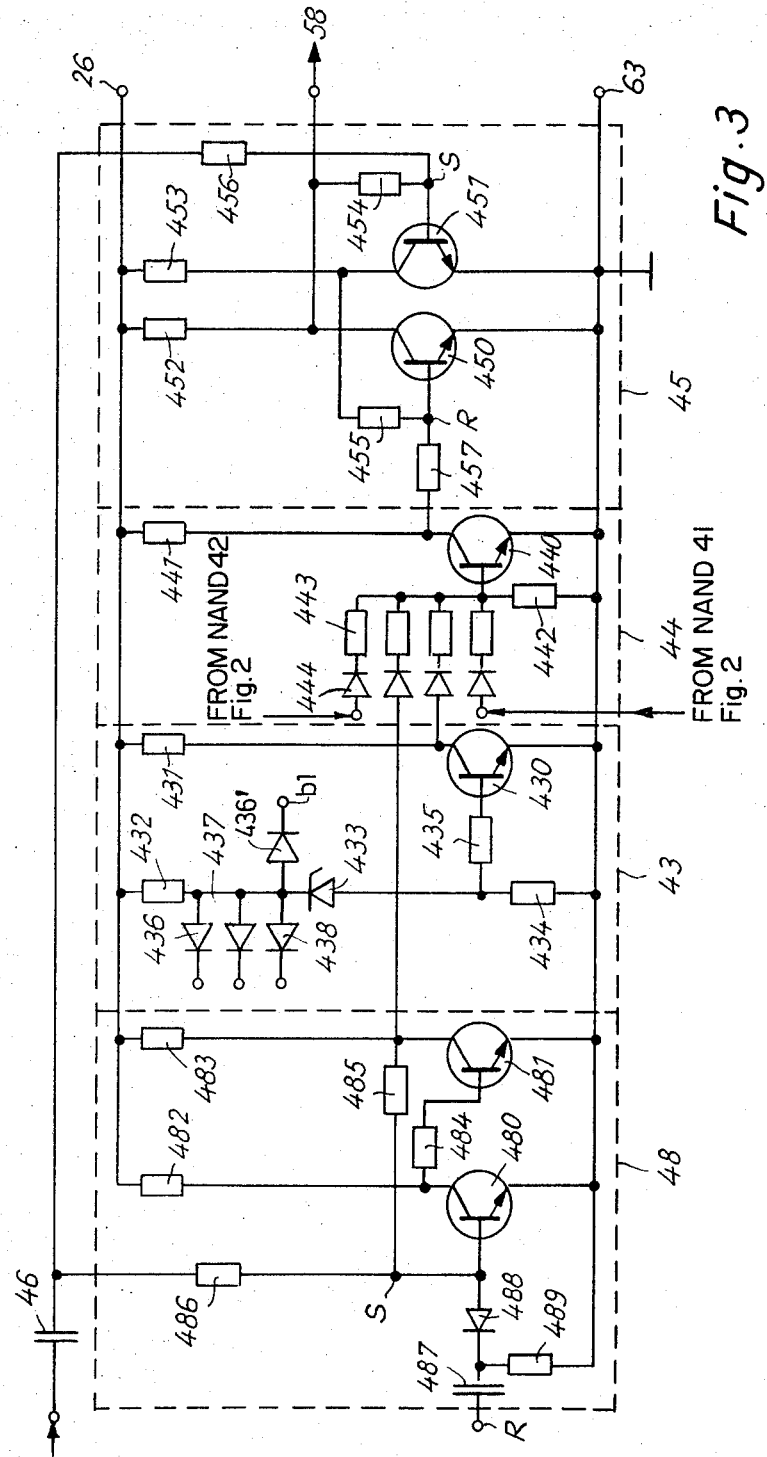
FIG. 3 is a more detailed circuit diagram illustrating several of the blocks of FIG. 2.

FIG. 3 shows the detailed circuit diagram of the second bistable FF 48, the fourth NAND-gate 43, the first NOR-gate 44, and the first bistable FF 45. Current is supplied over positive bus 26, there is a ground or chassis return 63 and the output from FF 45 is connected to NOR-gate 58, as indicated by the arrow.

The second bistable FF 48 has two npn transistors 480, 481, having collector resistors 482, 483. Two coupling resistors 484, 485 connect the collector of one transistor with the base of the other. The base of first transistor 480 forms the set input S of the second bistable FF 48, and is connected over resistor 486 to capacitor 46. A reset input R is a dynamic input, connected to the base of the first transistor 480 by means of the series connection of a capacitor 487 and a diode 488. The junction between the capacitor 487 and diode 488 is connected over resistor 489 to chassis bus 63.

The fourth NAND-gate 43 has an npn transistor 430 as its active component. The emitter of transistor 430 is directly connected to chassis bus 63; the collector is connected over collector resistor 431 with positive bus 26. Positive bus 26 and chassis bus 63 are connected by a voltage divider formed of resistor 432, Zener diode 433, and resistor 434. The base of the resistor 430 is connected over coupling resistor 435 with the junction between Zener diode 433 and resistor 434. The junction point between the resistor 432 and the Zener diode 433 is connected to the anodes of four diodes 436, 436; 437, 438. The cathodes of diodes 436, 436; 437, 438 form the inputs to the fourth NAND-gate 43. The cathodes of diodes 436, 436', 437, 438 are connected to the respective terminal $b1$ of the antilock system of a respective wheel.

The first NOR-gate 44 has an npn transistor 440 as its active element, which is connected by a collector resistor 441 to positive bus 26, and has its emitter directly connected to chassis bus 63. The base is connected over base resistor 442 to chassis bus 63. Four parallel circuits formed of the series connection of diodes 444 and resistors 443, each, are connected to the base of transistor 440. One of those diode-series resistors is connected to the output of the second bistable FF 48, that is, to the collector of transistor 481. Another connection is derived from the output of the fourth NAND-gate 43, that is, from the collector of transistor 430. The other two terminals connected to the diode-resistor series circuits are connected to the outputs of NAND-gate 42 and NAND-gate 41, respectively (see FIG. 2). The first bistable FF 45 is identical to the second bistable FF 48 with respect to the connection of the transistors 450, 451, collector resistors 452, 453 and coupling resistors 454, 455, and similar elements have been given similar reference numerals decremented by 30. The base of the second transistor 451 forms the set input S, the base of the first transistor 450 the reset terminal R. The reset terminal R is connected over a resistor 457 to the collector of transistor 440 in the first NOR-gate 44.

Figure 4:
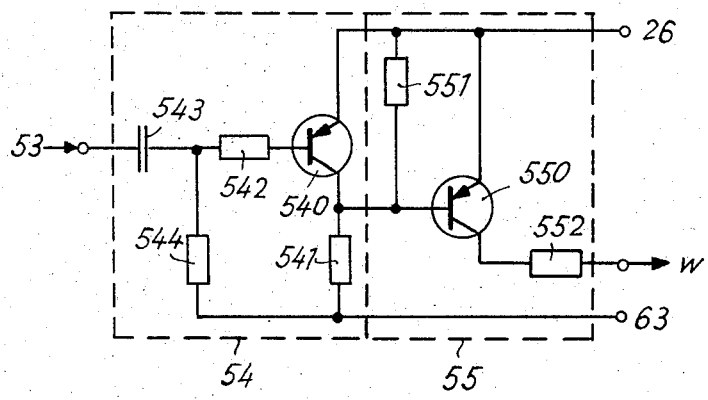
FIG. 4 illustrates details of blocks of the system of FIG. 2.

The monostable FF 54 and inverter stage 55 are shown in FIG. 4. Monostable FF 54 has a single pnp transistor 540, connected with its emitter to positive bus 26 and with its collector, over collector resistor 451, to the negative bus 63. The base of transistor 540 is connected over a series circuit formed of resistor 542 and capacitor 543 to the input, shown schematically as the arrow derived from FF 53. The junction between capacitor 543 and resistor 542 is connected to a resistor 544 which connects with chassis bus 63.

The inverter stage 55 has a pnp transistor 550 as its active element, the emitter of which is connected to positive bus 26 and the collector of which is connected over resistor 552 to terminal w. The base of transistor 550 is connected by means of a base resistor 551 to positive bus 26; the base, forming the input terminal, is connected to the collector of transistor 540 of monostable FF 54.

The various AND-gates forming the logic gates utilize diode-transistor logic with Zener diodes (DTLZ logic). The DTLZ logic has the advantage of particularly high noise rejection. It is particularly suitable for use in automotive vehicles, where noise pulses are apt to occur.

Operation of elements of FIGS. 3 and 4: The NAND-gate 43 will be selected as an example for any of the NAND-gates, which are similar, and also as an example for use of the DTLZ logic. The number of inputs can be extended by merely adding further diodes similar to diodes 436, 437, 438 and connecting them like the diodes 436–438. Transistor 430 can be conductive only when the cathodes of all the input diodes 436 to 438 provide a 1-signal. In this case, NAND-gate 43 provides a 0-signal. As soon as the cathode of at least one of the input diodes has a 0-signal, transistor 430 will block and the NAND-gate will provide a 1-signal.

The first NOR-gate 44 is identical to the other NOR-gates, and FIG. 3 gives the example of any one of the NOR-gates. The number of inputs can be increased as desired, by providing further series circuits similar to resistors 443 and diode 444, and connecting the series circuits to the base of transistor 440. Transistor 440 is conductive if one of the input diodes 444 has a 1-signal thereon and NOR-gate 44 will provide a 0-signal. When all input diodes 444 provide a 0-signal, the output of NOR-gate 44 will have a 1-signal.

The first bistable FF 45 is constructed in conventional manner. When a 1-signal is applied to set input S, the first transistor 451 will be conductive, blocking transistor 450, and the fifth NOR-gate 58 will have a 1-signal applied thereto. When a 1-signal is connected to reset terminal R, the first bistable FF 45 will reset and a 0-signal will appear at its output.

The outputs which provide a 1-signal in their quiescent position, that is, when the set input has a 1-signal applied thereto are indicated by the crossed terminal in FIGS. 2 and 6. The uncrossed outputs are complementary and, in the quiescent or base position of the FF provide a 0-signal. The third bistable FF 53 is similar to the first bistable FF 45, with the exception that the collector of the other transistor is used as the output terminal (since it will be complementary). The circuit of the second bistable FF 48 is slightly different from the circuit of the other two bistable FFs, since a dynamic reset input R is provided. The second bistable FF 48 is set by a 1-signal at its set input in the base state, or condition. The second bistable FF 48 is reset as soon as the output signal of the second NOR-gate 47 changes from 1 to 0, thus providing a pulse over capacitor 487 and diode 488 to the base of transistor 480.

The monostable FF 54 of FIG. 4 is so arranged that, in quiescent condition, transistor 540 is conductive. It receives base current over resistors 542, 544. At its output, the monostable FF 45 thus provides a 1-signal, that is, the collector of transistor 540 will then be approximately at the level of positive bus 26. When the output signal of the third bistable FF 53 changes from 0 to 1, that is, after energization of the reset input R, a positive voltage pulse is transferred over capacitor 543 to the base of transistor 540. The transistor 540 remains blocked for such time until the capacitor 543 is recharged over resistor 544 to such an extent, that the transistor 540 again receives base current. The blocking time is determined by the time constant of the R-C circuit formed of resistor 544 and capacitor 543. When the transistor is blocked, monostable FF 54 provides a 0-signal at its output.

The inverter stage 55 is so connected that transistor 550 has its base controlled by the monostable FF 54. Its output signal is derived from the collector. The output signal w will therefore provide a 0-signal when the monostable FF 54 provides a 1-signal, and vice versa.

Figure 5:
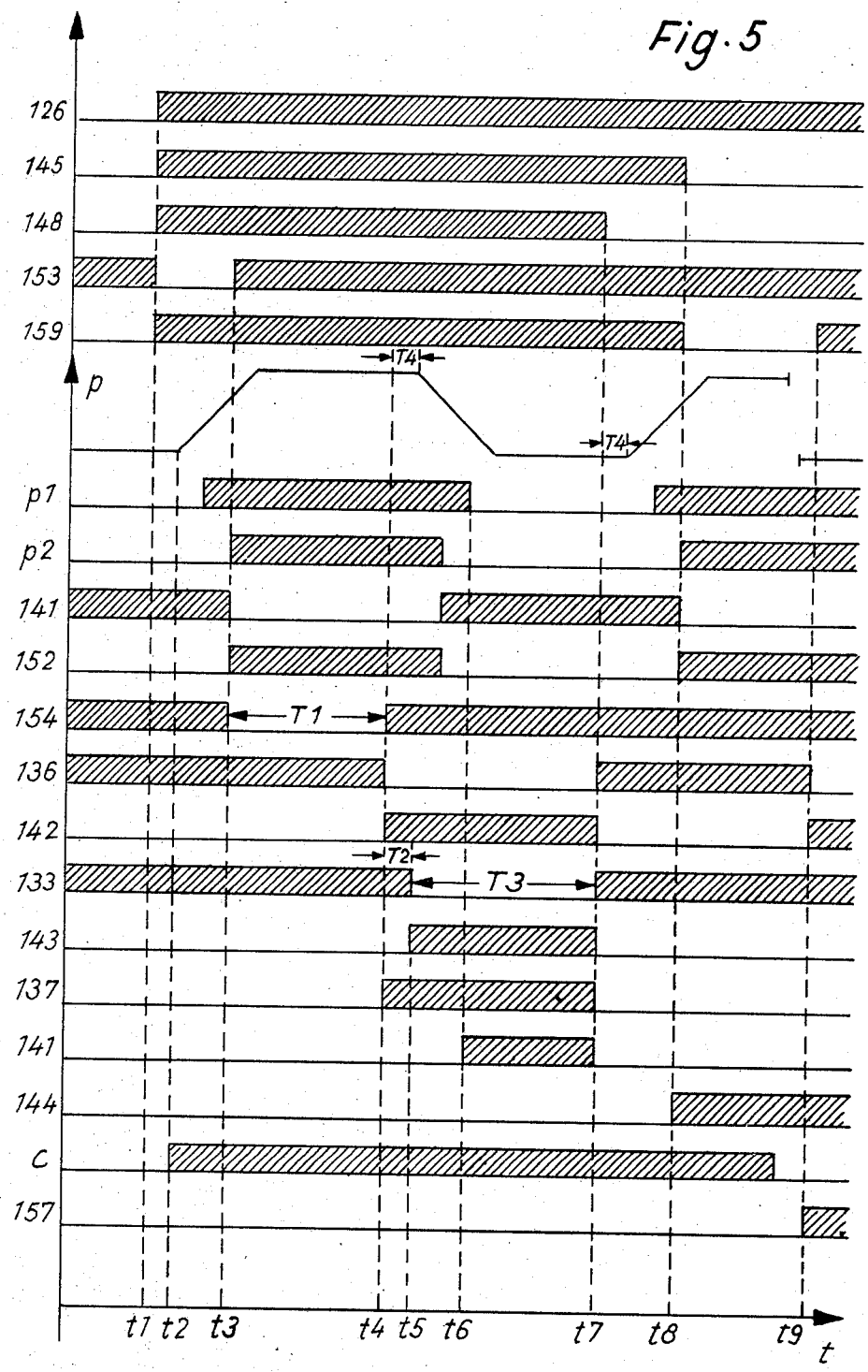
FIG. 5 is a timing diagram illustrating signals arising in the circuit of the present invention.

Operation of test circuit, with reference to FIGS. 2 and 5: The cross hatched surfaces in FIG. 5 indicate those time periods in which the respective stages provide a 1-signal. The various pulse trains are drawn on lines which have the same reference numerals as the corresponding elements of FIG. 2, incremented by 100. The graph p indicates the brake fluid pressure vs time graph during the test cycle. The graphs p1 and p2 indicate the output signals of two pressure switches associated with different wheels of the vehicle. The output signal of the brake light switch 28 is indicated at graph line c.

It is assumed that the vehicle is stopped, engine off (ignition switch disconnected) and parking brake on. Upon operation of the ignition switch 61, control lamp 50 will light, and inverter stage 51 will provide a 0-signal.

In the description that follows, instants of time are indicated by $t$, and elapsed time, or time durations by T.

The operator closes ignition switch 61 at time $t1$. Positive bus 26 receives supply voltage, for example battery voltage. Capacitor 46 transfers the resulting positive voltage pulse to the set inputs S of the three FFs 45, 48, 53 which will be set. As a result, the first and the second bistable FFs 45, 48 provide a 1-signal, whereas the third FF 53 provides a 0-signal at its output.

After setting of the first FF 45, the fifth NOR-gate 58 provides a 0-signal. Inverter 59 provides a 1-signal, and indicator lamp 60 will light. In advance of the setting of the first bistable FF at time $t1$, all three inputs of the fifth NOR-gate 58 had 0-signals thereon, since the third NAND-gate 42 (see graph 142) initially provides a 0-signal. The input of the first NOR-gate 57 provides a 0-signal since, in advance of time $t1$, a 1-signal is derived from inverter stage 56.

The transition of the output signal of the first bistable FF from 0 to 1, as noted, causes indicator lamp 60 to light. This is an indication to the operator that he must initiate testing of the system by depressing the brake pedal. This is assumed to occur at time $t2$. Brake pressure p will rapidly increase in the subsequent interval. Due to differences in manufacture, line length, routing, and other inequalities, not all the pressure switches associated with the various vehicle wheels will respond simultaneously. Let it be assumed that pressure switch $p1$ first provides a 1-signal, whereas the last pressure switch $p2$ provides a 1-signal only at time $t3$. Let it be further assumed that the remaining pressure switches respond between times $t2$ and $t3$, that is, have a response time intermediate that of the switches $p1$ and $p2$.

After the second switch, that is switch $p2$ has responded, all inputs of the second NAND-gate 41 have 1-signals thereat, and the second NAND-gate 41 thus provides a 0-signal after time $t3$. Both inputs of the third NOR-gate 52 now have 0-signals, so that NOR-gate 52 provides a 1-signal and the third bistable FF 53 is reset (see graph line 153). The output signal of the third bistable FF 53 jumps at time $t3$ to 1 and triggers the monostable FF 54 which provides a 0-signal for its time duration T1 after time t3. This 0-signal is inverted in inverter stage 55 into a 1-signal. Terminal $w$ (FIG. 1), diode 39 and resistor 40 are therefore approximately at the value of voltage of the positive line at the output of the frequency - d-c voltage converter 31. As a result, the input to the differentiator 32, the vehicle wheel simulation stage 34, and the summing circuit 35 have this voltage applied. This simulates the output signal from frequency voltage converter 31 for the three elements connected to the frequency voltage converter 31: differentiator 32, vehicle speed simulation stage 34 and comparator 35. The signal corresponds to maximum vehicle speed.

Operation of the brake pedal causes brake pressure p to rise rapidly, and after time $t3$ it will reach its maximum value. This maximum value will remain for that period of time until the pulse period T1 of monostable FF 54 is elapsed. After elapse of this pulse period T1, the output signal of the monostable FF 4 changes to 1, which is inverted in inverter stage 55 to provide a 0-signal. At the end of the pulse period T1 of monostable FF 57, a delay signal is thus simulated. The input voltages of the differentiator 32, the vehicle speed simulation stage 34 and comparator 35 will change in that direction as if the vehicle speed would suddenly change from maximum speed to 0. Storage capacitor 341 (FIG. 1) cannot discharge so rapidly, however, and comparator 35 will signal excessive speed (simulated) between vehicle and wheel circumference. The second threshold switch 36 will respond at time $t4$ (end of pulse period T1) and provide a 0-signal to the first NAND-gate 37. The output signal 137 (FIG. 5) of the first NAND-gate 37 changes to 1 and renders transistor switch 38 conductive, which energizes solenoid 19 and brake fluid pressure $p$ will drop after a short time delay T4. The time delay T4 is determined by the mechanical inertia and response time of the pressure control valve 14.

Upon change of the simulated wheel speed at terminal $w$ from 1 to 0, at time $t4$, differentiator 32 will respond. After a short delay T2, the output signal of the differentiator becomes so negative that at time T5 the third threshold switch 33 will respond and provide a 0-signal — see graph 33, FIG. 5. If at time $t4$, or a short time thereafter, all threshold switches 36 associated with the various wheels of the vehicle which have an anti-lock system connected thereto, have responded, then all inputs of the third NAND-gate 42 will have a 0-signal thereon. The third NAND-gate 42 thus provides at time $t4$ a 1-signal. Similarly, fourth NAND-gate 43 provides a 1-signal at time $t5$, since all the first threshold switches 33 provide 0-signals.

Solenoid 19 of the valve 14 continues energized and in the time after t4, the fluid pressure in the wheel brake cylinder line will drop. The various wheel pressure switches $p1$, $p2$ will reset. Pressure switch $p2$, having the highest switch threshold level will reset first. One input of the second NAND-gate 41 will thus have a 0-signal, and the second NAND-gate 41 will provide a 1-signal at its output. The output signal of the third NOR-gate 52 then reverts back into the 0 condition. The third bistable FF 52 is no longer influenced thereby, since it is already reset, having changed state at time $t3$.

Pressure switch $p1$, assumed to have the lowest response threshold is the last to change back which occurs at time $t6$. When all the first threshold switches 33 and all the second threshold switches 36 have responded, and all pressure switches $p1$ have reset, then, at time $t6$, all inputs of the second NOR-gate 47 will have a 0-signal. The second NOR-gate 47, at time t6 thus provides a 1-signal to the dynamic reset input R of the second FF 48. The dynamic reset input R includes a diode 488 (see FIG. 3) which passes only negative pulses and the second bistable FF, even after time $t6$ remains in its initial state in which it provides a 1-signal.

Differentiator 33 includes a differentiating capacitor which provides a delayed signal after the sudden change of input voltage which occurred in time $t4$. This differentiating capacitor is discharged after the time duration T3 (see graph 133, FIG. 5) to such an extent that the first threshold switch 33 changes back into its original condition and again provides a 1-signal. This occurs at time $t7$. To facilitate the presentation, let it be assumed that in the identical period of time $t7$, storage capacitor 341 of the vehicle wheel simulation stage 34 is also discharged to such an extent that the second threshold switch 36 returns into its initial position and provides a 1-signal. Thus, from time $t7$ on, transistor switch 38 is blocked and, after the short period of time $t4$ determined by the inertia and response time of the valve 14, fluid pressure in the brake line will again rise.

Starting at time $t7$, all inputs of the third and fourth NAND-gates 42, 43 will have 1-signals. The two NAND-gates 42, 43 will thus provide 0-signals starting from time $t7$ to the first NOR-gate 44. The second NAND-gate 41 still provides a single 1-signal to the first NOR-gate 44 and thus the first bistable FF 45 cannot yet be reset.

Brake fluid pressure will rise after the time $t7 + T4$ and the various pressure switches $p1...p2$ will again respond. After response of the last pressure switch $p2$, all inputs of the second NAND-gate 41 will have 1-signals, and it will therefore provide a 0-signal at its output. At time t8, therefore, all inputs of the first NOR-gate 44 will have 0-signals, and the output of the first NOR-gate 44 will change at time $t8$ to 1. The first bistable FF 45 is reset. Let it be assumed that a time limiting circuit has been connected to terminal $d$, but has not yet responded, and thus at time $t8$, all inputs of the fifth NOR-gate will have 0-signals, so that the output will be a 1-signal which is inverted in the inverter stage 59 again into a 0-signal, and indicator lamp 60 will extinguish at time $t8$.

Extinction of lamp 60 is an indication that all essential elements of the anti-lock system operate properly, and that the vehicle may be started.

The circuit arrangement in accordance with the invention continuously monitors the important elements of the system, namely the pulse generator 30, the d-c - a-c converter 31, the speed simulation stage 34 as well as the second threshold switch 36.

Let it be assumed that, during driving of the vehicle, and at a random time $t9$, with the vehicle in motion, one of the pulse transducers 30 fails, for example by a break in one of its wires, a connection, or the like. Upon such failure, the output voltage of the frequency - d-c converter 31 will rapidly decrease, and the second threshold switch 36, by comparison of voltages in comparator 35 will provide an indication of excessive difference between vehicle speed and that speed which is represented by the signal from the sensor (assumed to have failed), so that its output will be a 0-signal (graph 136, FIG. 5). The driver, however, did not operate the brake at time $t9$ so that the terminal $c$ of the brake light switch will have a 0-signal thereon. Both inputs of the fourth NOR-gate 57 now have a 0-signal applied at time $t9$, since one of the inputs of the third NAND-gate 42 has a 0-signal thereon. The output of the fourth NOR-gate 57 provides a 1-signal and indicator lamp 60 again lights, as seen in graph 159, FIG. 5. The connection to lamp 60 is over the fifth NOR-gate 58 and inverter 59. This is a signal to the operator that there is something wrong with the anti-lock system and that particular caution must be exercised in operating the vehicle, and especially upon brake operation.

Embodiment of FIG. 6: Essentially, the embodiment of FIG. 6 is similar to that explained in connection with FIG. 2 and only the differences will be described in detail. A second monostable FF 64 is connected between the ignition switch 61 and the set inputs of the three bistable FFs 45, 48, 53. After the ignition switch 61 is operated, and during its pulsed time, a positive output pulse is provided from FF 64, which changes the three bistable FFs 45, 48, 53 into their base state. Indicator lamp 50 is not connected between the parking brake switch 49 and chassis, however, but rather between the parking brake switch 49 and positive bus 26. The reset input of the third bistable FF 53 is connected directly to the output of the second NAND-gate 41. The inverter stage 51 is omitted in the embodiment of FIG. 6. The third NOR-gate 52 has its input connected to the output of the third bistable FF 53 and its other input to the junction between the indicator lamp 50 and the parking brake switch 49. The output of the third NOR-gate 52 is connected to the set input S of the first monostable FF 54. The network to check the brake light switch (terminal $c$) has been omitted in the embodiment of FIG. 6. The outputs of the first bistable FF 45 and the third NAND-gate 42 are connected to the two inputs of the fifth NOR-gate 58. The indicator lamp 60 is directly connected to the output of the fifth NOR-gate 58. The third input to connect a terminal $d$, that is, a time limit circuit, is omitted from NOR-gate 58.

The test program proceeds is exactly the same manner as in the second example. Upon closing of ignition switch 61, the three bistable FFs 45, 48, 53 are set by the second monostable FF 64. Using a second monostable FF 64 rather than the capacitor 46 has the advantage that noise or other erroneous pulses are reliably suppressed and cannot lead to possible erroneous indications from the test program.

The first monostable FF 54 is set by a 1-signal at its set input S, that is, as soon as the third bistable FF 53 is reset. Both inputs of the NOR-gate 52 will then have 0-signals applied so that it will provide a 1-signal at its output. The operating reliability of a tachometer generator can be checked when the vehicle is in motion, similarly to the first embodiment, by the third NAND-gate 42 and the fifth NOR-gate 58.

Summary of test sequence (with reference to FIG. 5): Upon operation of the main switch 61, the three bistable FFs 45, 48, 53 are set, and the first bistable FF 45 will energize indicator lamp 60. The operator must then operate the brake, so that brake pressure rises in all wheel brake cylinders. As soon as all pressure switches have responded, the third bistable FF 53 is reset and the monostable 54 is triggered. This checks functioning of all pressure switches and tightness of the brake pressure system.

After the pulse period of the monostable FF 54 has passed, a simulated wheel deceleration signal is applied to the threshold switches 33, 36, or, rather, to the stages in advance of the threshold switches 33, 36. The threshold switches 33, 36 now must respond and provide 0-signals. The NAND-gates 42, 43 test response of all the threshold switches. Simultaneously, fluid pressure in the braking system is decreased so that, after some elapsed time, the various pressure switches will reset. As soon as the last pressure switch has reset, the second NOR-gate 47 provides a 1-signal which indicates that all pressure switches have properly responded, that is the pressure switches associated with the sensing of various levels of wheel rate of change of speed, as well as thresholds associated with wheel slip (difference between circumferential wheel speed and vehicle speed). Further, a 1-signal at the output of the second NOR-gate 47 is indicative that all pressure switches, once they have responded, will again disconnect.

Various minor differences may arise in the further sequence of the test program, depending on the particular construction of the brake anti-lock system. The brake anti-lock system described in connection with FIG. 1 assumed that after a time delay signal, all threshold switches 33, 36 return to quiescent state together, exactly at time $t7$. In actual operation, however, this will hardly be the case. Wheel anti-lock systems are also known in which the two threshold switches 33, 36 are so dimensioned that they provide 0-signals beyond the time $t8$. Such systems usually will have a timing circuit which closes the bleeder valve already before resetting of the threshold switches 33, 36, so that brake fluid pressure $p$ can again rise. The output of the second NOR-gate will change from 1 to 0, independently of the construction of the brake anti-lock system, when either one of the threshold switches 33, 36 resets, or after one of the pressure switches $p1$, or another one, has again responded after increase of brake fluid pressure. The first 1-signal at one of the outputs of the second NOR-gate 47 provides a transition to a 0-signal at its output. This transition is utilized to influence the dynamic reset input R of the second bistable FF 48 so that it will reset.

After reset, the second bistable FF 48 provides a 0-signal. This is a precondition for the first NOR-gate 44 to again provide a 1-signal. This 1-signal will be derived only when the three NAND-gates 41 to 43 all provide a 0-signal, the NAND-gates supervising operation of the pressure switches and the threshold switches. In the embodiment described in connection with FIG. 5, this occurs at time $t7$. The indicator lamp 60 extinguishes when the first bistable FF 45 has been reset by the NOR-gate 44, provided, that the brake light switch 28, connected to terminal $c$, operates properly.

Extinction of the indicator lamp thus is an indication to the operator: there is no trouble in the anti-lock system; all threshold switches have responded properly; all threshold switches have reset; all pressure switches connected; all pressure switches again disconnected; all pressure switches again reconnected.

Constructing the reset input R of the second FF 48 as a dynamic input has the important effect that only resetting of the second NOR-gate 47 can reset the second FF 48, whereas the continuous 0-signal at the output of the second NOR-gate 47 in the period of time from $t1$ to $t6$ does not influence the second bistable FF 48.

The circuit in accordance with the present invention can be utilized for various types of vehicle wheel brake anti-lock systems. A simpler system may use a mechanical acceleration sensor with an inertia mass, rather than the electronic system 29 (FIG. 1). In such a case the various pressure switches $p1$ are supervised, and it is possible to eliminate the two NAND-gates 42, 43. If the anti-lock system uses an electronic acceleration sensor with a differentiator 32, then the fourth NAND-gate 43 must be provided. The third NAND-gate 42 is only necessary when additionally to wheel deceleration, vehicle speed is compared with circumferential wheel speed, in the simulation stage 34, so that a second threshold switch 36 is provided. Further threshold switches to respond to other stages of a wheel anti-lock system may be provided, which can be connected to further inputs of the fifth NOR-gate 58. Response of these threshold switches causes indicator lamp 60 to light. Terminal 52' may be used.

The indicator lamp 60 can of course, be replaced by an acoustical warning signal, or the like.

The present invention has been described with logic gates utilizing generally inverting type gates (NAND-gates; NOR-gates). These gates can be replaced by their logical equivalent, for example the NOR-gates can be replaced by AND-gates and the NAND-gates by OR-gates, with suitable inverter stages added (or omitted) to provide properly coded output signals. Various changes and modifications may be made in the system, which can readily be adapted to simpler, or more complicated wheel anti-lock systems, having different wheel speed or rate of change of wheel speed criteria. Additional NAND-gates corresponding to NAND-gates 41, 42, 43 may be provided, connected to NOR-gate 58, for example through NOR-gate 44 and first FF 45, with logic connection to adjust their timed response in the light of the function of the respective elements, and the time period during which they should, under normal conditions, be operative. Features described with any one of the embodiments may, of course, be used with other embodiments, within the inventive concept.

The specification and claims refer to wheel deceleration or acceleration, both terms being merely indicative of wheel rate of change of speed and used interchangeably, in the sense that wheel deceleration is the equivalent of a negative wheel acceleration.

We claim:

1. Test system to test operational reliability of a vehicle wheel brake anti-lock system having a pressure fluid operated brake, a pressure relief valve (14) in the pressure fluid line to the brake, controlled switching means (38) controlling operation of said relief valve (14), and a wheel acceleration sensing means (29) having means (32, 33) generating a deceleration signal ($b1$) connected to and controlling operation of the controlled switch means (38) when a predetermined level of wheel deceleration is sensed, said test and monitor system comprising
    a pressure switch (25) connected to be responsive to fluid pressure in the respective wheel brake cylinder (16) and providing a pressure signal ($p1$);
    electrical means (54) generating a simulated wheel deceleration signal ($w$) connected to the deceleration signal generating means (32, 33);
    a test indicator (60);
    a logic circuit (44) having said deceleration signal ($b1$) and said pressure signal ($p1$) applied thereto and logically combining said signals to provide an output signal indicative of presence of the pressure signal ($p1$) and the wheel deceleration signal ($b1$); and controlled switch means (45) connected to said indicator, and being controlled to set to "test" state upon energization of the controlled switching means, said controlled switch means being further connected to and controlled by the output of said logic circuit (44) to reset in response to an output from said logic circuit (44).

2. System according to claim 1 wherein the deceleration simulation means comprises a monostable flip-flop (54).

3. System according to claim 1 wherein the controlled switch means sensing output from said logic circuit (44) comprises a first bistable flip-flop (45) having a set input (S) and a reset input (R), an energization switch (61) for the system, the set input (S) being controlled by the energization switch and the reset input (R) by said logic circuit (44).

4. System according to claim 1 for use with a wheel anti-lock system wherein the wheel acceleration-deceleration sensing means comprises a pulse tachometer generator (30), a frequency voltage converter (31) connected to the tachometer generator, and a differentiator (32) connected to receive the output from the converter to provide a wheel rate of change signal, and a first threshold switch (33) forming said deceleration signal generating means and providing said deceleration signal when the wheel speed rate of change exceeds the predetermined level;

the output (w) of the wheel deceleration simulating means (54) being connected to the input of the differentiator (32);

and the logic circuit (44) comprises a logic gate (44), having the outputs of the first threshold switch (33) and of the pressure switch (25) applied thereto, the output of the logic gate (44) being connected to said controlled switch means (45).

5. System according to claim 4 wherein said controlled switch means comprises a first bistable flip-flop (45), the output of said logic gate (44) being connected to the reset input (R) of the first bistable flip-flop (45).

6. System according to claim 4 wherein the wheel anti-lock system further comprises a speed comparison loop including a comparator comparing circumferential wheel speed and vehicle speed, the comparator (35) having one input connected to the output of the frequency - voltage converter, and wherein a second threshold switch (36) is provided controlled by the output from said comparator (35) and changing state when sensed wheel speed and vehicle speed exceed a predetermined level;

and wherein the output of the second threshold switch (36) is connected as a further input to the logic gate (44).

7. System according to claim 6 to test the operating reliability of a plurality of wheel brake anti-lock systems, associated with different wheels of the vehicle, wherein a plurality of logic gates (41, 42, 43) are provided, having their outputs connected to said first logic gate (44);

said plurality comprising at least second, third and fourth logic gates, the second logic gate (41) having connected thereto as input the outputs of all the pressure switches (25) associated with the respective vehicle wheels; the inputs of the third logic gate (42) being connected to the outputs of all the second threshold switches (36) associated with the respective anti-lock systems; and the inputs of the fourth logic gate (43) being connected to the outputs of all the first threshold switches (33) of all the anti-lock systems.

8. System according to claim 7 wherein the controlled switch means sensing change of response of the pressure switches comprises a first bistable flip-flop (45) having a set input (S) and a reset input (R);

a second bistable flip-flop (48), the output of the second bistable flip-flop being connected to the first logic gate (44) the set inputs of said flip-flops (45, 48) being enabled by the main switch of the vehicle;

and a system logic gate (47) is provided, all pressure switches (25), all first threshold switches (33) and all second threshold switches (36) being connected to the inputs of the system logic gate (47), the output of the system logic gate controlling the reset terminal of the second bistable flip-flop (48), the reset terminal of said first bistable flip-flop (45) being controlled by said pressure switches (25).

9. System according to claim 8 wherein said system logic gate is a conjunctive gate (NOR - 47).

10. System according to claim 8 wherein said first logic gate is a conjunctive gate (NOR - 44).

11. System according to claim 7 wherein the electrical means simulating a wheel deceleration signal comprises a monostable flip-flop (54);

a third bistable flip-flop (53) is provided, the output of the second logic gate (41) being connected to the reset input of the third bistable flip-flop (53), the set input of the third bistable flip-flop being connected to the main vehicle switch (61) and said monostable flip-flop (54) being controlled by the output from the third bistable flip-flop (53).

12. System according to claim 11 wherein the vehicle has a parking brake switch (49), a fifth logic gate (52) is provided connected to the reset input (R) of the third bistable flip-flop (53);

said fifth logic gate having connected to its inputs: the parking brake switch (49) and the output of said second logic gate (41).

13. System according to claim 12 wherein said fifth logic gate is a conjunctive gate (NOR - 52).

14. System according to claim 11 wherein the vehicle has a parking brake switch (49); the system comprises a fifth logic gate (52), the output of the fifth logic gate (52) being connected to the set input (S) of the monostable flip-flop (54) forming said wheel deceleration simulating means, the inputs to fifth logic gates comprising: the output of the parking brake switch (49) and the output of a third bistable flip-flop (53), the setting of which is controlled by closing of the main vehicle switch (61) and the resetting by sensing of change in pressure of the pressure switches of the vehicle brake anti-lock systems (FIG. 6).

15. System according to claim 14 wherein the fifth logic gate (52) is a conjunctive gate.

16. System according to claim 7 further comprising a sixth logic gate (58), the output of which is connected to the test indicator (60), the outputs of the third logic gate (42) and of the first bistable flip-flop (45) being connected to inputs of said sixth logic gate (58) to provide an indication of malfunction during operation of the vehicle by energization of the indicator upon simultaneous occurrence of sensing of change of response of the pressure switch and difference between wheel speed and vehicle speed in excess of a predetermined value.

17. System according to claim 16 wherein said sixth logic gate comprises a conjunctive gate (NOR-58).

18. System according to claim 16 further comprising additional inputs (52') to said fifth logic gate (52), said additional inputs being connected to stages of the anti-lock system to be monitored.

19. System according to claim 18 further comprising a seventh logic gate (57) having its output connected to an additional input of the sixth logic gate (58);

one input of said seventh logic gate being connected to the brake light switch (28) of the vehicle, and another input of the seventh logic gate being connected to the output of the third logic gate (42), said seventh logic gate being conjunctive.

20. System according to claim 1 wherein a single test system is provided to test the operability of a plurality of wheel anti-lock systems, each one associated with a different wheel of the vehicle;

wherein said test and monitoring system comprises a plurality of logic gates (41, 42, 43), one of said logic gates (41) being connected to all the pressure switches (25) of the respective anti-lock systems, and sensing brake fluid pressure (p1) in the respective wheel brake cylinders;

and wherein the wheel anti-lock systems each comprise at least one threshold switch (35, 36) responding when the difference in respective wheel speed and between another measured speed exceeds a predetermined limit, said test and monitoring system further comprising at least one further logic gate (42) and having connected thereto as input (v1) the outputs of all said threshold switches (36) comparing wheel speed with another speed.

21. System according to claim 20 wherein two further logic gates (42, 43) are provided, said one logic gate (42) having connected as an input signal representative of difference between wheel circumferential speed and vehicle speed in excess of a predetermined level;

and the other logic gate (43) having connected thereto as inputs said deceleration signals (b1) representative of instantaneous rate of change of wheel speed in excess of the predetermined level.

22. System according to claim 1 wherein the system comprises a plurality of bistable flip-flops (45, 48, 53); the vehicle has a main switch (61) and a source of power supply (62);

and a capacitor (46) is provided, connected to the set inputs (S) of the bistable flip-flops (45, 48, 53) and to the switch, to transfer a pulse to the set inputs upon closing of the switch.

23. System according to claim 1 wherein the vehicle has a main switch (61) connectible to a source of vehicle power supply (62);

said system comprises at least one bistable flip-flop (45, 48, 53);

and a trigger monostable flip-flop (64) is provided, connected to the set inputs (S) of the bistable flip-flops (45, 48, 53) the trigger flip-flop being triggered by closing of the main vehicle switch (61) and connection to the vehicle power supply.

24. System according to claim 1 wherein said system comprises logic gates including at least one of: NAND-gates; NOR-gates; inverter stages;

and wherein the logic gates comprise DTLZ components to improve noise rejection of the system.

25. System according to claim 1 wherein the test indicator (60) includes a light indicator connected to light during test, and extinguishing upon proper operation of the system and after said wheel deceleration signal simulating means has operated to simulate wheel deceleration, resulting in the wheel anti-lock system passing through all steps of a first cycle of simulated response to simulated wheel deceleration above a predetermined limit.

26. System according to claim 1 further comprising a logic circuit (NOR-57; NAND-42) interconnecting the pressure switch, the test indicator (60) and the acceleration sensing means (29), said logic circuit being connected to energize the test indicator when:

a. the acceleration sensing means (29) provides an output indicative of excessive wheel deceleration and b. the pressure switch is in a position indicative of non-operation of the brake, to provide an output indicative of trouble in the brake anti-lock system and when the brake has not been operated.

27. Test system to test operational reliability of a vehicle wheel brake anti-lock system having a pressure fluid operated brake and a controller therefor, a pressure relief valve (14) in the pressure fluid line to the brake, controlled switch means (38) controlling operation of said relief valve (14), a wheel deceleration/acceleration sensing means (29), an anti-lock circuit controlled by the deceleration/acceleration sensing means connected to and controlling operation of the controlled switch means (38) when a predetermined level of wheel rate of change of speed is sensed, a vehicle main switch (61) to connect the system to a source of power (62, 26), and a brake monitor switch (28; c) operated upon operation of the vehicle brake controller, said test and monitor system comprising means (25) connected to be responsive to fluid pressure in the respective brake cylinder (16);

electric means simulating, for a limited time, a wheel rate of change of speed signal and energized upon energization of the main switch (61), the wheel rate of change of speed signal being thereupon applied to said anti-lock circuit;

a logic circuit energized upon energization of the main switch (61), the anti-lock circuit being connected to said logic circuit, said logic circuit evaluating the response of said anti-lock circuit upon having said simulated wheel deceleration signal applied thereto and upon operation of the brake controller, said logic circuit including electrical means (45) connected to said pressure sensing means (25) to sense change of fluid pressure commanded by the controller and modified by said anti-lock system;

a test indicator (60) connected in the logic circuit and providing an indication during:

a. simultaneous application of brake pressure by the brake controller and b. initial response of the anti-lock system and continued bleeding of pressurized brake fluid, the indicator changing-indication upon cessation of bleeding of pressurized brake fluid when the simulated wheel rate of change of speed signal has terminated, to thereby indicate proper operation of the anti-lock system, but remaining in indicated position upon malfunction due to non-response of the anti-lock system or continued response of the anti-lock system after cessation of said simulated wheel rate of change of speed signal.

* * * * *